United States Patent [19]

Veitenhansl et al.

[11] Patent Number: 4,826,998
[45] Date of Patent: May 2, 1989

[54] ETHER SULFONATES AS ANTISTATIC AGENTS

[75] Inventors: Rudolf Veitenhansl, Haan; Wolfgang Froeschke, Wuppertal; Robert Piorr, Ratingen-Hoesel, all of Fed. Rep. of Germany

[73] Assignee: Henkel Kommanditgesellschaft auf Aktien, Duesseldorf, Fed. Rep. of Germany

[21] Appl. No.: 772,836

[22] Filed: Sep. 5, 1985

[30] Foreign Application Priority Data

Sep. 29, 1984 [DE] Fed. Rep. of Germany ....... 3435841

[51] Int. Cl.$^4$ .................. C07D 327/02; C07D 327/04; C07D 327/06
[52] U.S. Cl. ......................................... 549/14; 549/40; 549/89
[58] Field of Search ..................... 260/513 T; 252/551; 549/14, 40, 89

[56] References Cited

U.S. PATENT DOCUMENTS

| | | | |
|---|---|---|---|
| 1,985,747 | 12/1934 | Steindorff et al. | 260/513 T |
| 3,197,333 | 7/1965 | Schönfeldt | 117/139.5 |
| 4,028,283 | 6/1977 | Murata | 252/551 |
| 4,029,608 | 6/1977 | Murata | 252/551 |

FOREIGN PATENT DOCUMENTS

| | | | |
|---|---|---|---|
| 3331513 | 3/1985 | Fed. Rep. of Germany | 260/513 T |
| 772860 | 4/1957 | United Kingdom | 252/551 |
| 1536207 | 12/1978 | United Kingdom | 252/551 |
| 1566770 | 5/1980 | United Kingdom | 260/513 T |

OTHER PUBLICATIONS

Piorr et al, DE 3331513 (Abstract with Filing and Publication Date), Pergamon Infoline, 11 Oct. 1986.
Mackey et al, C.A., vol. 92, 1982, 92:13643m.
Pfeifer, Josef, C.A., vol. 79, 1973, 79:20243r.

*Primary Examiner*—John M. Ford
*Attorney, Agent, or Firm*—Ernest G. Szoke; Wayne C. Jaeschke; Henry E. Millson, Jr.

[57] ABSTRACT

Salts of sulfonic acids of the type formed in the sulfonation of alkenyl alkyl polyglycol ethers corresponding to the following formula

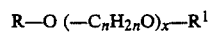

$$R-O(-C_nH_{2n}O)_x-R^1$$

with sulfur trioxide, followed by hydrolysis, are used as antistatic agents for plastics. R is a straight chain $C_{10}-C_{22}$ alkenyl group, $R_1$ is a $C_1-C_{12}$ alkyl group, n is an integer of from 2 or 4, and x is an integer of from 0 to 35. The products show a particularly long-lasting effect as external antistatic agents on polyamide fibers.

4 Claims, No Drawings

ETHER SULFONATES AS ANTISTATIC AGENTS

BACKGROUND OF THE INVENTION

1. Field of the Invention

This invention relates to the use of selected sulfonated polyethers as agents for preventing the static charging of plastic surfaces.

2. Description of Relevant Art

Due to their high volume resistivity, plastics have the property of accumulating electrical charges at their surfaces. This static charging of plastics, which is particularly serious in the presence of friction, is generally undesirable and attempts have long been made to prevent charging, either permanently or temporarily by a variety of measures, but especially by the inclusion of special additives, so-called antistatic agents. Thus, substances added to the plastics before molding are known as internal antistatic agents while substances applied subsequently to the surfaces are known as external antistatic agents.

The wide variety of compounds which have already been proposed for this purpose is in itself proof of the fact that a universal antistatic agent, i.e. one which is equally suitable for all plastics and applications, has not yet been found. On the contrary, most of the proposed compounds show weaknesses in many plastics, including inadequate compatibility, reluctance to accumulate at the surface or minimal adhesion to the surface, or, alternatively, only act under certain conditions such as, for example, high relative air humidity. Others can be used to only a limited extent due to their toxic properties or their color.

Particular importance is now attached to antistatic agents in the textiles field, firstly because the percentage of synthetic fibers is continuously increasing and secondly because manufacturers are using increasingly faster machines in which the fibers are exposed to extremely severe friction. In this specialized field also there are no universal antistatic agents either for the processing of endless fibers (filaments) and staple fibers or for the treatment of semi-finished and finished products. One particular problem in this respect is the antistatic finishing of polyamide fibers despite the fact that polyamide (PA) has a higher affinity for water than other synthetic fiber materials, such as polyester (PES) or polyacrylonitrile (PAC). The external antistatic agents commonly used today, such as for example ethoxylated fatty amines, long-chain phosphoric acid partial ester salts and long-chain paraffin sulfonate salts, always produce at most a temporary reduction in the electrostatic charging of PA, losing their effectiveness after periods of a few days or a few weeks. The reasons for this loss of activity have not yet been explained.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, an object of the present invention is to provide an antistatic agent for plastics which covers a broad range of applications. Another object of the invention is to develop an antistatic agent specifically for use in the textile field; a particular object in this respect being to provide an antistatic agent which develops a long-lasting effect on polyamide fibers.

According to the invention, these objects are achieved by using, as antistatic agents for plastics, water-soluble salts of sulfonic acids of the type formed in the sulfonation of alkenyl alkyl polyglycol ethers correspondingg to the following formula $$R-O(-C_nH_{2n}O)_x-R^1 \qquad I$$

with sulfur trioxide, followed by hydrolysis. In formula I, R is a straight-chain $C_{10}$–$C_{22}$ alkenyl group, $R^1$ is a $C_1$–$C_{12}$ alkyl group, n is an integer of from 2 to 4, and x is an integer of from 0 to 35. The salts preferably contain as cations alkali metal, alkaline earth metal or ammonium ions derived from ammonia or from alkanolamines containing up to 9 carbon atoms.

It is preferred to use salts of sulfonic acids in the starting material of which R was an unsaturated fatty alkyl group, more particularly the oleyl group, the linoleyl group, or the $C_{22}$-fatty alkenyl group derived from erucic alcohol. The alkyl group $R^1$, which can be branched, preferably contains from 1 to 8 carbon atoms. More preferably, $R^1$ represents the n-butyl group. The preferred values for n are 2 and 3, i.e. products derived from polyethylene glycol ethers or from polypropylene glycol ethers or from mixed poly(ethylene/propylene glycol) ethers, in which case x preferably has a value of from 5 to 30. Preferred cations are the sodium, potassium, ethanolammonium, diethanolammonium and triethanolammonium ions.

Some of the alkali metal salts suitable for use in accordance with the invention are described in copending application Ser. No. 644,482 filed Aug. 24, 1984, which also describes a process for producing these compounds and their use as surfactants for detergents and cleaners.

Like the salts mentioned in the above copending application, all other sulfonic acid salts suitable for use in accordance with the invention can also be produced by reacting an alkenyl alkyl polyglycol ether corresponding to the following formula $$R-O(C_nH_{2n}O)_x-R^1 \qquad I$$

in which R, $R^1$, n and x are as defined above, with sulfur trioxide, introducing the reaction product into an aqueouus solution of from 1 to 1.2 equivalents of a suitable base per mole of added $SO_3$ and heating the solution until the soltones formed have been hydrolyzed.

The sultones formed as main products in the sulfonation process are described by the following formula $$\begin{array}{c} R^2-O(C_nH_{2n}O)_x-R^1 \\ \diagup \quad \diagdown \\ SO_2 \longrightarrow O \end{array} \qquad (II)$$

in which $R^1$, n and x are as defined above and $R^2$ is a straight-chain $C_{10}$–$C_{22}$ alkyl or alkenyl group twofold substituted by the —$SO_2$—O— moiety and thus partially included in the 4 to 6 membered ring of the sultones.

Hydrolysis of these sultones results in the formation of the corresponding hydroxy sulfonic acids and unsaturated sulfonic acids (through the elimination of water) or their salts respectively. Accordingly, the salts used in accordance with the invention are generally derived from a mixture of ether sulfonic acids essentially containing the above-mentioned sulfonic acids which, collectively, can also be described by the following formula $$HO_3S-R^3-O(-C_nH_{2n}O)_x-R^1 \quad (III)$$

in which $R^1$, n and x are as defined above and $R^3$ is a $C_{10}-C_{22}$ alkenylene, hydroxyalkylene or hydroxyalkenylene group emanating from the R group.

The salts of the invention have the formula $$Y^{(+m)}(\ominus O_3S-R^3-O(C_nH_{2n}O)_x-R^1)_m \quad (IV)$$

wherein m is 1 or 2, n, x, $R^1$ and $R^3$ have the meanings given above, and Y is an alkali metal cation, an alkaline earth metal cation, the ammonium cation or a $C_2-C_9$ alkanolammonium cation.

The starting products of formula I can be obtained by methods known from the literature. Their production is based on unsaturated alcohols corresponding to the formula R—OH which are reacted in known manner with x moles of an alkylene oxide of the formula $C_nH_{2n}O$, preferably with ethylene oxide or propylene oxide or with mixtures of these alkylene oxides. Mixtures of homologous alkoxylates are obtained, their average degrees of alkoxylation corresponding to the quantity of alkylene oxide added. The etherification of the terminal hydroxyl group of the unsaturated alkoxylates is also carried out by methods known from the literature. For example, it can be carried out by converting the alkoxylate with an alkali metal into the alcoholate and reacting the alcoholate thus formed with an alkyl halide, for example with an alkyl chloride of the formula $R^1$—Cl. In another process, the alkoxylate is reacted at elevated temperature with an alkyl halide in the presence of a finely powdered alkali metal hydroxide. Finally, the alkoxylate can be reacted with an alkyl chloride or alkyl bromide of the general formula $R^1$—Cl or $R^1$—Br in the presence of an aqueous solution of NaOH or KOH in accordance with British Pat. No. 1,566,770.

The unsaturated alcohol R—OH is preferably an unsaturated $C_{16}-C_{22}$ fatty alcohol, more particularly oleyl alcohol, linoleyl alcohol, erucic alcohol, or a mixture of these alcohols, for example a commercial fatty alcohol cut consisting predominantly of those alcohols. Small amounts of saturated alcohols, for example cetyl and stearyl alcohol, are acceptable, particularly if the products of general formula I produced therefrom by alkoxylation and etherification are themselves soluble in water. Commercial cetyl-oleyl and oleyl-linoleyl alcohol cuts having an iodine number of from 70 to 130 are particularly preferred.

The above described sulfonic acid salts are preferably used as external antistatic agents, i.e. the salts are applied to the surfaces of the plastics articles after the initial molding process. The salts are preferably applied in the form of solutions in suitable solvents, particularly water, so that the surfaces can be uniformly finished without difficulty, for example, by spray coating, spread coating or brush coating. In addition to batch application, continuous application, for example by fixed nozzles, rollers or immersion baths, is also possible, particularly where production is continuous, as for example in the manufacture of fibers.

The antistatic agents of the invention are generally employed in aqueous or aqueous alcohol solutions in a quantity of from 0.1 to 40% by weight, preferably 0.5% to 20% by weight, based on the weight of the solution.

The antistatic agents of the invention are preferably not applied alone, but instead are applied in the form of combinations with other plastics auxiliaries. In the production and processing of synthetic fibers, such auxiliaries are, for example, smoothing agents, coupling agents, finishing agents and highgrade finishing agents which can also be applied in the form of emulsions or dispersions. In the finishing of carpeting or needle felt, the antistatic agents can be applied, for example, together with the wet filled latex coatings which are used for backing and stabilization.

The use of the antistatic agents of the invention is particularly advantageous when it is desired to obtain a long-lasting, but readily removable finish for the plastic. This is the case, for example, when electrostatic charging is likely to occur only during the further processing of the plastic, but not during the subsequent use of the plastic end products.

In the textiles industry, a preferred field of application, the advantages of using the antistatic agents according to the invention can be seen particularly clearly on synthetic fibers, such as polyacrylonitrile (PAC), polyester (PES) and polypropylene (PP), but especially on polyamide fibers. These fibers may be antistatically finished with the agents according to the invention immediately after production by melt-spinning or even at a later stage of the processing cycle, for example after further processing into staple fibers, and thereafter retain their antistatic properties for so long that, even after intermediate storage for several weeks or months, satisfactory further processing, for example by spinning, warping and weaving, undisturbed by electrical charging is possible without any need for refinishing.

The invention will be illustrated, but not limited, by the following examples.

EXAMPLES

1. Production of the ether sulfonate salts.

Unsaturated ethers corresponding to the formula $R-O-(C_nH_{2n}O-)_xR^1$ were continuously reacted with gaseous $SO_3$ at elevated temperature in a falling-film reactor. For hydrolysis and neutralization, the sultones issuing from the reactor were introduced into an aqueous solution of the desired base (approx. 2% excess, based on $SO_3$) and heated to reflux in that solution to complete hydrolysis. The concentrated solutions formed were used directly, without further purification, optionally after dilution, for the antistatic finishing of plastics.

Salts derived from bases requiring very long reaction times for hydrolysis of the sultones could be produced more quickly from the sodium salts by ion exchange.

Table 1 gives examples of the compounds thus produced.

TABLE 1

| | Production of the ether sulfonate salts | | | | | |
|---|---|---|---|---|---|---|
| No. | R-OH Name | I. No. | n | x | $R^1$ | Cation |
| I | 10-undecen-1-ol | 147 | 2 | 8 | $C_2H_5$ | Mg |
| II | oleyl alcohol, commercial | 94 | 2 | 3 | $n-C_4H_9$ | K |
| III | oleyl alcohol, commercial | 94 | 2 | 5 | $n-C_4H_9$ | Na |

TABLE 1-continued

| | | Production of the ether sulfonate salts | | | | |
|---|---|---|---|---|---|---|
| No. | R-OH Name | I. No. | n | x | $R^1$ | Cation |
| IV | oleyl alcohol, commercial | 54 | 2 + 3 (60:40) | 5 | n-$C_4H_9$ | Ca |
| V | oleyl alcohol, commercial | 94 | 2 | 5 | n-$C_8H_{17}$ | $H_3N-CH_2-CH_2-OH$ |
| VI | oleyl alcohol, commercial | 94 | 2 | 5 | n-$C_{12}H_{25}$ | K |
| VII | oleyl alcohol, commercial | 94 | 2 | 10 | n-$C_4H_9$ | Na |
| VIII | oleyl alcohol, commercial | 94 | 2 | 20 | n-$C_4H_9$ | Na |
| IX | oleyl alcohol, commercial | 54 | 2 | 32 | n-$C_4H_9$ | Na |
| X | linoleyl alcohol, commercial | 122 | 2 | 20 | n-$C_4H_9$ | Ca |
| XI | linoleyl alcohol, commercial | 165 | 4 + 2 (20:80) | 20 | n-$C_4H_9$ | $HN(-CH_2CH_2-OH)_3$ |
| XII | erucic alcohol, commercial | 80 | 2 | 30 | n-$C_4H_9$ | Ca |
| XIII | erucic alcohol, commercial | 80 | 2 | 25 | $CH_3$ | Na |

I. No. = iodine number

2. Antistatic finishing of plastic surfaces

For the antistatic finishing of records, solutions of 0.3% by weight of the products according to the invention in isopropanol:water (70:30 parts by volume) were prepared and applied by means of a soft plastic sponge to brand-new long-playing phonograph records (diameter 30 cm). 0.2–0.4 g of the solution remained on either side, drying after a short time without leaving any droplets. In order to assess the antistatic effect, the records were placed in their sleeves and quickly removed again three times in succession in a dry, heavily dust-laden atmosphere. The dust attracted to the records was assessed in laterally incident light and was compared with the amount of dust on similarly treated, but not antistatically finished records. Evaluation was carried out on a scale of 0 (complete absence of dust) to 5 (for the non-antistatically finished records). The values shown in Table 2 are average values from the evaluation of four identically finished and treated records.

TABLE 2

| | Antistatic effect on records | | | |
|---|---|---|---|---|
| Antistatic agent | III | V | XI | None |
| Evaluation | 2 | 1–2 | 2–3 | 5 |

3. Antistatic finishing of synthetic fibers

The antistatic effect of the products of the invention was tested on polyamide staple fibers by comparison with state-of-the-art products. To this end, washed and dried polyamide flocks (Enka-Perlon, dtex 2.2/40 mm, mat, raw white) were spread out and sprayed with solutions containing 0.5% by weight of the antistatic agents in such a way that 0.1 or 0.2% by weight of the antistatic agent, based on the weight of the fibers, was uniformly distributed over the fibers. After drying at 80° C. in a drying cabinet, the fibers were prepared on the opener and stored in that form at 22° C./65% relative air humidity. The fiber material was then treated twice on a laboratory card and the resulting electrostatic charging of the carded web was determined immediately afterwards. The measured quantity selected was the electrical field strength at a distance of 10 cm from the carded web which could be measured with an electrostatic induction field-strength meter of the Q 475 A type manufactured by the Eltex Co. of Weil-on-Rhine, Federal Republic of Germany.

The following antistatic agents were used:
According to the invention:
III, VII, VIII: Sodium sulfonate salts produced from polyglycol ethers corresponding to the formula
R—O—($C_2H_4O$—$)_n$$CH_2$—$CH_2$—$CH_2$—$CH_3$
III: R=oleyl, n=5
VII: R=oleyl, n=10
VIII: R=oleyl, n=20
State-of-the-art:

A: cocosamine + 10 ethylene oxide
B: potassium salt of the reaction product of 6 moles of lauryl alcohol and 1 mole of $P_4O_{10}$
C: sodium salt of a long-chain alkane sulfonate Table 4 below shows the results of the field strength measurements in kV/m as a function of the storage time of the test specimens:

TABLE 4

| | | Test results | | |
|---|---|---|---|---|
| Antistatic agent | Quantity applied % by weight | Storage time | | |
| | | 2 days | 28 days | 84 days |
| III | 0.1 | 10–15 | 20–30 | 20–30 |
| III | 0.2 | 2–8 | 7–8 | 8–10 |
| VII | 0.1 | 4–6 | 6–8 | 15–16 |
| VII | 0.2 | 2–3 | 0.8–1 | 1.5–2 |
| VIII | 0.1 | 0.7–1 | 1–1.3 | 3–4 |
| VIII | 0.2 | 0.2–0.6 | 0.1 | 0.1 |
| A | 0.1 | 3–4 | 10–15 | 20–30 |
| A | 0.2 | 0.9 | 8–10 | 20–30 |
| B | 0.1 | 0.6 | 30 | 56–60 |
| B | 0.2 | 0.2 | 20 | 40–50 |
| C | 0.1 | 100 | >120 | >120 |
| C | 0.2 | 80 | >120 | >120 |

The results shown in Table 4 reflect both the outstanding effectiveness of the products according to the invention shortly after application and also the outstanding maintenance of the effect, even after storage for 84 days.

Equally positive results are obtained on other synthetic fibers, more especially on polyester and polyacrylonitrile. In these cases, too, not only compounds III, VII and VIII, but also the other sulfonic acid salts of the invention described above give good to very good results.

What is claimed is:

1. A sultone of the formula

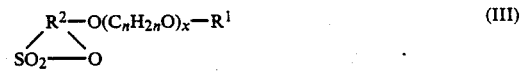

in which $R^1$ is a $C_1$-$C_{12}$alkyl group, n is an integer of from 2 to 4, x is an integer of from 0 to 35 and $R^2$ is a straight-chain $C_{10}$-$C_{22}$ alkyl or alkenyl group twofold substituted by the —$SO_2$—O— moiety and thus partially included in the 4 to 6 membered ring of the sultone.

2. A sultone in accordance with claim 1 wherein n is 2 or 3 and x is from 5 to 30.

3. A sultone in accordance with claim 1 wherein $R^2$ is oleyl, linoleyl, or the $C_{22}$ fatty alkenyl residue of erucic acid.

4. A sultone in accordance with claim 1 wherein $R^1$ is butyl.

* * * * *